Patented Dec. 9, 1924.

1,518,254

UNITED STATES PATENT OFFICE.

LLOYD G. COPEMAN, OF FLINT, MICHIGAN.

PROCESS OF CASTING STONE.

No Drawing.     Application filed March 26, 1923.  Serial No. 627,749.

*To all whom it may concern:*

Be it known that LLOYD G. COPEMAN, a citizen of the United States, residing at Flint, in the county of Genesee and State of Michigan, has invented certain new and useful Improvements in Processes of Casting Stone, of which the following is a specification.

This discovery relates to the moulding of plastic materials and has for its object the moulding of plastic materials in such a way as to provide a smooth, hard, finished surface for the exterior of the stonework resulting from the moulding operation. A further object of the invention is to provide a stonework casting with a light weight interior construction which will materially lessen the aggregate weight of the casting.

In a copending application No. 622771, I have described a process for moulding with plastic materials which expand when they set. I have found that the "oxo-chloride" cement and several other plastic or concrete materials in drying and hardening, expand. This makes it very difficult to remove the mould without injuring the casting. I find that by lining the mould with a film of easily fusible material such as paraffine it is possible to use this as a spacing element between the mould and casting. After the casting has set and it is time to remove the mould, I find that the mould can be very easily removed by dipping same first into hot water to melt the paraffine. This gives enough clearance between the cast and the face of the mould so that no difficulty will be found in stripping the casting of the mould.

However, as I have explained in a copending application No. 625123, it is very difficult to lay a film of material on the paraffine. I find that ordinarily solutions or mixtures will not adhere to the paraffine so as to form a homogeneous coating for the outside of the stonework. However, in this copending application, I have described a solution of alcohol and gypsum as being suitable to provide an initial film of gypsum on which the finishing coating of the casting may be sprayed. The present discovery involves another method of causing the finishing coating of the casting to adhere to the paraffine.

I take the cement, which is preferably oxo-chloride cement, mixed to about the consistency of putty or a little thinner. I then mix this plastic cement with alcohol until it is thin enough to spray on the dies. However, I have first coated the dies with a coating of paraffine or some other fusible spacing element as already referred to. I then spray this alcohol diluted plastic material upon the paraffine coating. As an alternative method, the mixture of the alcohol with the plastic material may be made thicker and it may be applied to the dies with a spatula. Either method is satisfactory. I find that when this thin coating of plastic material is sprayed on with an air brush, the force of its impact beats out all the little air holes and lays the cement perfectly smooth on the paraffine coating. Or, if it is put on with a trowel or spatula, it can be pressed hard enough to exclude the little air holes and afford a smooth surface.

The alcohol in this mixture is then allowed to evaporate and the substance still clinging to the paraffine coating returns to its original consistency. As soon as the alcohol has evaporated I immediately fill the mould with more cement or preferably, a mixture of cement and ground cork, sawdust or some other light material. The "mud" or mixture, to be more proper contains enough moisture in the form of magnesium chloride to again moisten the adhering coating so that the coating and the newly introduced cement will unite in a homogeneous mass.

The casting is now allowed to set and dry, and when the moulding is stripped therefrom, it will be found that the outside face of the casting is smooth and hard and of a fine texture, due to the way the air holes have been beaten out of same either by separately applying same to the interior of the mould by a spraying operation, or by a spatula. This forms an outer encasing shell in which is supported the rougher cement mixture or the rough mixture of cement and some light material such as sawdust, cork or anything that will not chemically affect the cement mixture. It will be understood that the pure cement mixture which is applied to the paraffine coating by spraying or by a spatula forms an encasing shell, in which the rougher material used to line the same is in no way exposed.

This method can have several variations and is of great importance as it permits the making of articles out of a solid casting within given weight limits, which would not otherwise be possible out of plastic materials. In fact, in casting stonework of concrete and cement mixtures of the character described, it has often been necessary to use a wooden core floated in the mould so as to reduce the otherwise great weight of the casting. Furthermore, it is possible by a slight variation of this method to vary the weight of the casting in different portions. For instance, in a base ball bat made of this cement, different parts of the bat may be made of a heavier cement for purposes of balance and efficiency.

It will be apparent from this description that the processes and resulting product has a wide range of application and usefulness. Hence, I do not care to be limited any more than is necessary by the terms employed in the claims.

What I claim is:

1. The process of casting with plastic materials, which comprises the applying of a film of cement mixed with a volatile liquid to the face of the mould, then allowing the volatile solvent to evaporate, and then filling the interior of the casting with a mixture of cement and a weight lessening material.

2. The process of casting plastic materials, which comprises the applying of a wet cement mixed with a volatile liquid to the face of the mould and then allowing the volatile liquid to escape by evaporation and then introducing a mixture of cement and a weight reducing mixture, such as cork.

3. The process of casting plastic materials, which comprises the lining of the mould with a film of easily fusible material, the applying of alcohol and cement to the fusible material, and filling the interior of the mould with a plastic aggregate of cement.

4. The process of casting plastic materials, which comprises the lining of the face of the mould with a film of paraffine, the applying of cement diluted with alcohol to the paraffine and then filling the interior of the mould with a plastic agregate of cement.

5. The process of casting plastic materials, which comprises the lining of the mould with a film of paraffine, the applying of cement diluted with alcohol under force to the paraffine film and then after the alcohol has evaporated filling the interior of the mould with a moist aggregate of cement.

6. The process of casting plastic materials, which comprises the lining of the mould with a parting or spacing material in the form of a film, the applying of a cement diluted with alcohol to said parting film and allowing the alcohol to evaporate, and then filling the interior with a moist aggregate of cement.

7. The process of casting plastic materials, which comprises the lining of the mould with a film of fusible parting material, the spraying of a cement diluted with alcohol upon the parting film, and the filling of the interior of the mould with a moist aggregate of cement.

8. The process of casting plastic materials, which comprises the lining of the mould with fusible parting material, the spraying of a liquid diluted cement upon the parting material, the allowing of a large portion of the liquid to evaporate, and the filling of the interior of the mould with a moist aggregate of cement and weight reducing material after the liquid in the sprayed material is allowed to evaporate.

9. The process of casting plastic materials, which comprises the lining of the mould with an easily fusible parting material, the spreading with force upon the parting material, of a film of liquid-diluted cement, allowing the liquid to largely evaporate and then filling the interior of the mould with a moist aggregate of cement.

10. The process of casting plastic materials, which comprises the lining of a mould with a film of paraffine, the application of a film of liquid-diluted cement to the paraffine under force to press out the air and afford a smooth finishing coating, permitting the liquid to largely evaporate and then introducing a moist aggregate of cement into the interior of the mould.

In testimony whereof I affix my signature.

LLOYD G. COPEMAN.